(12) United States Patent
Schumann

(10) Patent No.: US 11,338,518 B2
(45) Date of Patent: May 24, 2022

(54) METHOD FOR OPERATING AT LEAST ONE APPARATUS FOR MANUFACTURING OF THREE-DIMENSIONAL OBJECTS

(71) Applicant: CONCEPT LASER GMBH, Lichtenfels (DE)

(72) Inventor: Philipp Schumann, Itzgrund-Schottenstein (DE)

(73) Assignee: CONCEPT LASER GMBH, Lichtenfels (DE)

( * ) Notice: Subject to any disclaimer, the term of this patent is extended or adjusted under 35 U.S.C. 154(b) by 0 days.

(21) Appl. No.: 16/200,219

(22) Filed: Nov. 26, 2018

(65) Prior Publication Data

US 2019/0160756 A1 May 30, 2019

(30) Foreign Application Priority Data

Nov. 29, 2017 (EP) ..................................... 17204494

(51) Int. Cl.
*G05B 19/418* (2006.01)
*B29C 64/393* (2017.01)
(Continued)

(52) U.S. Cl.
CPC .......... *B29C 64/393* (2017.08); *B29C 64/171* (2017.08); *B29C 64/264* (2017.08);
(Continued)

(58) Field of Classification Search
None
See application file for complete search history.

(56) References Cited

U.S. PATENT DOCUMENTS

2007/0233298 A1* 10/2007 Heide ..................... G06F 30/00
  700/98
2014/0140882 A1   5/2014 Syassen
  (Continued)

FOREIGN PATENT DOCUMENTS

CN    101542490 A    9/2009
CN    105103486 A    11/2015
  (Continued)

OTHER PUBLICATIONS

Japanese Office Action Corresponding to Application No. 2018071401 dated Jun. 4, 2018.
  (Continued)

*Primary Examiner* — Jason Lin
(74) *Attorney, Agent, or Firm* — Dority & Manning, P.A.

(57) ABSTRACT

Method for operating at least one apparatus (1) for additively manufacturing of three-dimensional objects (2-4) by means of successive layerwise selective irradiation and consolidation of layers of a build material (5) which can be consolidated by means of an energy beam (6), wherein a communication interface (10) connected or connectable with the at least one apparatus (1) is adapted to receive at least a first data set (15-17) comprising object data from at least a first user (12-14), relating to at least one object (2-4) to be built, and at least a second data set (15-17) comprising object data from at least a second user (12-14), wherein a manufacturing process of at least two objects (2-4) is controlled dependent on the data sets (15-17) of the at least two users (12-14).

17 Claims, 2 Drawing Sheets

Figure 1:
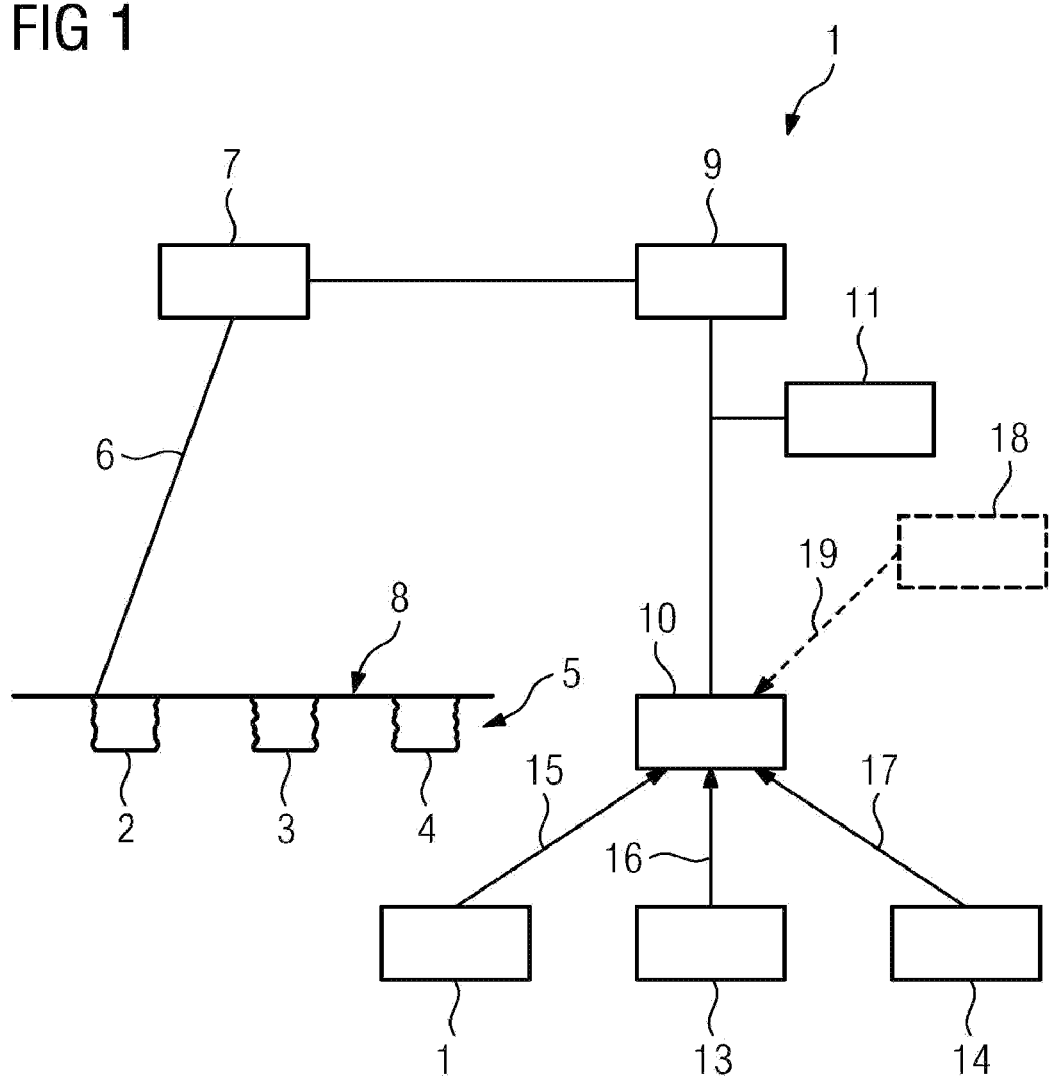

(51) Int. Cl.
  *B33Y 50/02* (2015.01)
  *B29C 64/171* (2017.01)
  *B29C 64/264* (2017.01)
  *G06Q 30/08* (2012.01)
  *G06Q 50/04* (2012.01)
  *G05B 19/4099* (2006.01)

(52) U.S. Cl.
  CPC .......... *B33Y 50/02* (2014.12); *G05B 19/4099* (2013.01); *G05B 19/41865* (2013.01); *G06Q 30/08* (2013.01); *G06Q 50/04* (2013.01); *G05B 2219/32309* (2013.01); *G05B 2219/49007* (2013.01)

(56) References Cited

U.S. PATENT DOCUMENTS

| | | | | |
|---|---|---|---|---|
| 2014/0156053 | A1* | 6/2014 | Mahdavi | G06Q 50/04 700/119 |
| 2015/0005919 | A1* | 1/2015 | McGatha | B29C 64/386 700/119 |
| 2015/0052025 | A1* | 2/2015 | Apsley | G06Q 30/0621 705/26.81 |
| 2015/0057784 | A1 | 2/2015 | Butler et al. | |
| 2015/0220291 | A1* | 8/2015 | Tapley | G06F 3/1211 358/1.15 |
| 2016/0159012 | A1* | 6/2016 | Lee | G05B 19/41865 700/98 |
| 2016/0209819 | A1 | 7/2016 | Cudak et al. | |
| 2016/0210312 | A1* | 7/2016 | Webb | G06Q 30/0635 |
| 2016/0229123 | A1* | 8/2016 | Carlson | B33Y 50/02 |
| 2017/0123407 | A1* | 5/2017 | Shiihara | B33Y 10/00 |
| 2017/0173888 | A1* | 6/2017 | Thomas-Lepore | H04N 1/4433 |
| 2017/0305067 | A1* | 10/2017 | Cortes | G06F 21/6209 |
| 2018/0207722 | A1* | 7/2018 | Feldmann | B22F 10/00 |

FOREIGN PATENT DOCUMENTS

| | | |
|---|---|---|
| CN | 106648887 A | 5/2017 |
| CN | 106715083 A | 5/2017 |
| EP | 1031302 A2 | 8/2000 |
| JP | 2017084306 | 5/2017 |
| JP | 2017177624 | 10/2017 |

OTHER PUBLICATIONS

European Search Report Corresponding to Application No. 17204494 dated May 31, 2018.

Chinese Search Report and Office Action Corresponding to Application No. 201810021558 dated Jul. 30, 2020.

\* cited by examiner

METHOD FOR OPERATING AT LEAST ONE APPARATUS FOR MANUFACTURING OF THREE-DIMENSIONAL OBJECTS

CROSS-REFERENCE TO RELATED APPLICATIONS

This application claims priority to European Patent Application Ser. No. 17 204 494.3 filed Nov. 29, 2017, the contents of which is incorporated herein by reference in its entirety as if set forth verbatim.

The invention relates to a method for operating at least one apparatus for additively manufacturing of three-dimensional objects by means of successive layerwise selective irradiation and consolidation of layers of a build material which can be consolidated by means of an energy beam.

Additive manufacturing apparatuses and methods for operating the same are well known in prior art. Said additive manufacturing processes are advantageous, in particular for manufacturing of prototypes, wherein the manufacturing of individual objects or small quantities of three-dimensional objects may be expensive. The entire build plane, i.e. the plane of build material inside a process chamber on which the energy beam is adapted to directly irradiate the build material, may only be occupied to a minor degree, if the apparatus is used to only manufacture individual objects or small quantities.

In particular, for users, e.g. for consumers, who only want to manufacture an individual object, e.g. a prototype (or small quantities of prototypes), additive manufacturing processes therefore, may not be affordable, since the individual user would have to bear the entire costs, wherein a significant amount of build material is wasted or has to be recycled, since building the individual object or small quantity may not make effective use of the available build plane.

Thus, it is an object to the present invention to provide a method for operating at least one apparatus for additively manufacturing of three-dimensional objects, wherein the costs for a user are reduced.

The object is inventively achieved by a method according to claim 1. Advantageous embodiments of the invention are subject to the dependent claims.

The method described herein is a method for operating an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The respective apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that a communication interface connected or connectable with the at least one apparatus is adapted to receive at least a first data set comprising object data from at least a first user, relating to at least one object to be built, and at least a second data set comprising object data from at least a second (another) user, wherein a manufacturing process of the at least two objects is controlled dependent on the data sets of the at least two users.

Therefore, at least two users may transmit, in particular send, data sets (first and second data set) that comprise object data via the communication interface to the at least one apparatus. The object data comprise information relating to the (typically different) objects the individual users intend to build, as will be described with respect to certain embodiments in detail below. The communication interface provides the respective means for transmitting the data sets to the apparatus. The communication interface therefore, may be built or comprise an arbitrary, in particular wired or wireless, connection, for example an internet connection. The user may, for instance, have access to an internet platform provided by the communication interface, via which the data sets may be transmitted, e.g. uploaded by the user and downloaded to the apparatus.

In other words both, the first and the at least one second user, transmit at least one data set comprising the object data relating to the at least one three-dimensional objects to be built to an apparatus for manufacturing three-dimensional objects. The manufacturing process that is performed on the apparatus is controlled dependent on the data sets that have been transmitted to the apparatus. Thus, the described method allows for the at least a two users to use the same apparatus to manufacture the individual objects. The at least two users may therefore, "share" the apparatus, in particular the same build plane of the at least one apparatus to manufacture their objects. The method therefore, allows for at least two users to each build at least one object on the same apparatus in the same manufacturing process, in particular on the same build plane.

Hence, by manufacturing only individual objects, e.g. prototypes, or small quantities of three-dimensional objects that each only occupy a minor degree of the available build plane, the users do not have to bear the costs of the entire manufacturing process, but the entire costs can be sub-divided in that the individual users may bear the costs in the appropriate proportion, e.g. proportional to the area of the build plane used for manufacturing the corresponding objects. Thus, by performing the inventive method on an apparatus for manufacturing three-dimensional objects even the manufacturing of individual objects and small quantities of objects becomes affordable to the individual users. The entire build plane that is available in the process chamber of the apparatus may be sub-divided, e.g. according to the number of and/or area required by the three-dimensional objects to be built. Optimally, the occupancy rate of the build plane is as high as possible so that the cost-benefit-ratio becomes advantageous to the individual users.

The communication interface may generally be connected directly or indirectly to the at least one apparatus. Thus, it is possible that the respective data set(s) may be received directly via the communication interface, e.g. via a direct wired or wireless connection. It is also possible to have the respective data sets transferred "manually" from the communication interface to the apparatus, e.g. via a direct connection, such as an automated transfer of the data set, i.e. dependent on at least one transfer criterion, or indirect connection, in particular via a portable data storage, such as a USB-stick. Of course, a combination of a direct and an indirect connection are also possible. A plant operator may, for example, select at least one data set to be transferred from the communication interface, in particular via a wired or wireless connection.

According to a first embodiment of the method, the at least one data set, in particular the object data, comprises at least one of the following parameters:

three-dimensional data of at least one object to be built
at least one chemical parameter of the object to be built, in particular a material parameter
at least one physical parameter of the object to be built, in particular a density and/or a mechanical property
time information relating to a due date
information relating to at least one post-processing step Hence, the data sets the at least two users send to the apparatus relate to the objects the individual users intend to have built using the apparatus. Of course, the individual data sets may differ, since the users typically intend to build different objects, e.g. differing in three-dimensional data, in particular the shape of the object. Further, each user may send multiple data sets relating to multiple objects, wherein it is also possible to have one data set relating to multiple objects and vice versa, e.g. if the object comprises at least two modules and/or assemblies, one data set my be provided for each module and/or assembly and the object itself is built by the entirety of modules and/or assemblies.

Therefore, the at least one data set, in particular the object data, may comprise three-dimensional data of the at least one object to be built. The respective user therefore, transfers, inter alia, three-dimensional data to the apparatus, e.g. the dimensions of the at least one object to be built. Based on three-dimensional data it is possible, for example, to derive the area of the build plane (or the volume of the build chamber, respectively) required for manufacturing the respective object. Thus, a determination is possible, whether the at least two objects can be built in the same manufacturing process, in particular on the same build plane.

Further, the respective user may transmit at least one chemical parameter of the object to be built, e.g. a material parameter and/or a physical parameter of the object to be built, in particular a density and/or a mechanical property. The respective chemical parameter may particularly relate to the build material the object is to be built of, for example a metal powder, e.g. aluminum and/or a ceramic and/or a synthetic material. Besides, the at least one physical parameter that may be transmitted to the apparatus may define a density and/or a mechanical property or various other physical parameters of the three-dimensional object such as the inner structure of the object. The respective chemical and/or physical parameters may particularly influence the costs (and the writing time required) of the manufacturing process of the at least one three-dimensional object.

At least one user may further add a time information to the data set which time information relates to a due date of the manufacturing process. In other words, the users may define a due date up to which the manufacturing process of the three-dimensional object has to be accomplished. The time information can therefore, be used to group users. The time information may define how long the individual users can wait for the manufacturing process to be finished. Thus, in the waiting time several other users may transmit data sets to the apparatus and therefore, the occupancy rate of the build plane may increase. By defining the time information the users may control how long the manufacturing process can be delayed or postponed to wait for other users to join the collective manufacturing process. Additionally, the user may add a price information defining the initiation of the manufacturing process, wherein the manufacturing process is initiated as soon as a defined price level is reached. Thus, the initiation of the manufacturing process depends on the occupancy rate of the build plane, wherein the manufacturing process is initiated as soon as the occupancy rate reaches a defined value, e.g. 80%. The dependency of the initiation of the manufacturing process on the time information and on the occupancy rate information can, of course, be arbitrarily combined.

Additionally, at least one user may add information relating to at least one post-processing step to the data set. The post-processing information defines whether and which treatment the at least one three-dimensional object requires after the manufacturing process has finished.

According to another embodiment of the method, the at least one data set comprises build data relating to the at least one object to be built. Build data in the scope of this application refer to the manufacturing process of the individual object the build data correspond to. For example, the build data may relate to the irradiation strategy used to manufacture the object or various other parameters of the apparatus for manufacturing three-dimensional objects that can be controlled, in particular affecting the manufacturing process. Hence, the at least one user may define the build data and therefore, select, for example which irradiation strategy is used in the manufacturing process.

Besides, it is also possible that the build data are generated by another user, for example a plant operator operating the apparatus the three-dimensional object is to be built with. It is also possible that the build data are generated automatically, e.g. by a control unit of the apparatus. The build data are, in either case, based on the data set and therefore, based on the object to be built. Hence, the at least two users (the first and the second user) can be grouped into a first user group, e.g. "consumer" or "client", wherein the other user (e.g. providing the build data) may assigned to a second user group, e.g. "plant operator" or "provider".

The respective build data may particularly comprise at least one of the following parameters:

at least one chemical parameter of the object to be built, in particular a material parameter
at least one physical parameter of the object to be built, in particular a density and/or a mechanical property
time information relating to a duration of the manufacturing process of the object to be built
material consumption
information relating to an irradiation strategy The build data are based on the data set the user (of the first user group) transmits to the apparatus and are therefore, based on the objects to be built. The build data define concrete parameters of the manufacturing process of the individual three-dimensional object. The build data may additionally contribute to the generation of a price information relating to the costs for the individual objects to be manufactured.

The method can further be improved by at least one set of job data generated dependent on the at least two data sets, wherein at least two objects are assigned to the same build plane dependent on the at least one set of job data. The job data in the scope of this application refer to the entire manufacturing process, e.g. information relating to the entire available build plane. Thus, the job data relate to the manufacturing of the at least two objects on the same build plane or in the same manufacturing process, respectively.

The job data may comprise at least one of the following parameters:
- number of objects assigned to at least one build plane
- time information relating to a duration of the manufacturing process of all objects assigned to the same build plane
- price information
- initiation information
- occupancy rate of a build plane of the at least one apparatus
- number of build jobs
- number of users Thus, the job data may relate to the number of objects assigned to the at least one build plane, for example, the apparatus the object data of at least two users have been transmitted to via the communication interface may comprise at least one build plane on which the at least two objects of the at least two users are to be manufactured. The job data may also relate to the area of the build plane that is required to manufacture the individual objects, wherein the required area of the build plane may particularly differ over the manufacturing process (in build direction), as the shape and/or the diameter of the individual cross-sections of the individual layers of the various objects, respectively, may differ in build direction. The build direction in the scope of this application refers to the direction the object is layerwise and successively built in. The build direction typically is essentially perpendicular to the build plane or a build plate carrying the build material, respectively.

Additionally or alternatively an occupancy rate of the build plane of the at least one apparatus can be contained in the job data, wherein the areas of the build plane required to manufacture the at least two objects add up to the overall area of the build plane that is required, wherein the occupancy rate may be defined as the ratio of the required area to the available area of the build plane.

The job data further may comprise a time information relating to a duration of the manufacturing process of all objects assigned to the same build plane. It is also possible to have the job data comprise information relating to the contributions of the individual objects to the overall manufacturing time. Thus, the ratio of the individual objects to be manufactured in the same manufacturing process on the overall process time can be taken into calculation, too.

For example, based on the time information and/or the number of objects and/or the occupancy rate, a price information may be generated corresponding to the individual objects to be manufactured in the manufacturing process, wherein various additional parameters may be taken into calculation, such as the material consumption and/or the irradiation strategy, for instance.

The job data may further comprise the number of build jobs (number of individual objects to be built in the same process) that are to be performed with the apparatus and/or the number of users that have transmitted their datasets to the apparatus. Besides, it is also possible to assign at least one object to one of multiple build planes, for example if more than one apparatus is available or at least one apparatus comprises more than one build plane, wherein the assignment may depend on the job data and/or the build data and/or the data set of the at least one user. For example, the assignment may be performed dependent on the build material the objects are to be built of and/or the price information and/or the time information.

The method can further be improved in that a manufacturing process is initiated dependent on the job data, in particular dependent on the at least one initiation information. Thus, the initiation information defines when the manufacturing process of the at least two objects is initiated. The initiation information itself can depend on various parameters, as described before, such as the time information relating to a due date contained in the dataset of at least one user.

According to another embodiment of the method, a data storage may be provided, wherein the job data and/or build data and/or the at least one data set (in particular object data) of at least one user is stored. The data stored in the data storage may subsequently be used for the manufacturing process and/or for documentation and quality management purposes. It is also possible to transfer the stored data to other apparatuses, for example dependent on the availability or the occupancy rate of the build plane.

Preferably, the data sets as well as the build data and/or the job data are transmitted and/or stored in an encrypted form. Thus, this embodiment assures that confidential information, such as the geometry or various construction parameters of individual objects, e.g. prototypes, of the individual users are encrypted and cannot be accessed by other users or, for example personnel that is not authorized to have access to these information. The communication interface may be designed as a platform on which at least one user (of the first user group) may transmit (upload and store) at least one data set relating to an object to be built. The communication interface may be connected to a plurality of apparatuses, wherein an assignment of the manufacturing process of the object to one of the available apparatuses may be performed automatically and/or dependent on a preference of the at least one user. Particularly, the communication interface may be designed as internet platform, wherein a plurality of users of the first user group has access to upload data sets. The communication interface may further provide access to at least one user of the second user group (provider, plant operator).

Additionally, a topology of an object to be built may be optimized, in that a material consumption and/or a build time and/or an occupancy rate of the build plane of the apparatus is reduced. Thus, the data sets comprising object data that are transmitted by the at least one user to the apparatus may be adjusted, in particular optimized, to make the manufacturing process more efficient. For example, the orientation of the object to be built with respect to the build plane can be changed to facilitate the manufacturing process and/or to reduce a material consumption. Further, the build data method may be adjusted, especially with respect to the irradiation strategy.

Besides, the invention relates to an apparatus for additively manufacturing of three-dimensional objects by means of successive layerwise selective irradiation and consolidation of layers of a build material which can be consolidated by means of an energy beam, wherein a communication interface connected or connectable with the at least one apparatus is adapted to receive at least a first data set comprising object data from at least a first user, relating to at least one object to be built, and at least a second data set comprising object data from at least a second user, wherein a control unit is adapted to control the manufacturing process of at least two objects dependent on the data sets of the at least two users.

Self-evidently, the inventive apparatus is adapted to perform the inventive method. Thus, all features, details and advantages described with respect to the inventive method are fully transferable to the inventive apparatus and vice versa.

Figure 2:
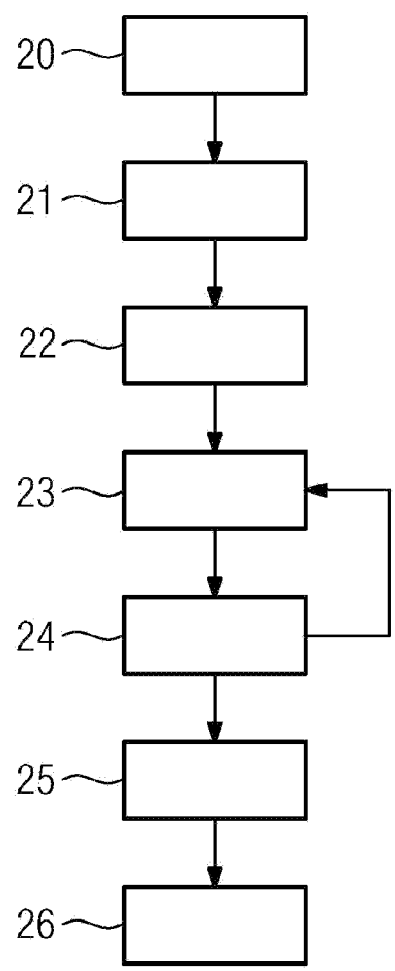

Exemplary embodiments of the invention are described with reference to the FIG. The FIG. are schematic diagrams, wherein FIG. 1 shows an inventive apparatus; and FIG. 2 shows a process diagram of the inventive method.

FIG. 1 shows an apparatus 1 for additively manufacturing of three-dimensional objects 2, 3, 4 by means of successive layerwise selective irradiation and consolidation of layers of a build material 5 which can be consolidated by means of an energy beam 6. To generate the energy beam 6 the apparatus 1 comprises an irradiation device 7 adapted to generate and guide the energy beam 6 (or multiple energy beams 6) onto a build plane 8 of build material 5. In other words, a surface of build material 5 is arranged in the build plane 8. For the sake of simplicity, only one build material 5 is depicted in the FIG., wherein it is, of course, possible to use different build materials 5 throughout the manufacturing process. Further, the number of objects 2-4 is merely exemplary, wherein any other number of objects 2-4 is possible.

The apparatus 1 further comprises a control unit 9 adapted to control, inter alia, the irradiation device 7 of the apparatus 1. According to the control of the control unit 9 the irradiation device 7 is adapted to generate at least one energy beam 6 and guide the energy beam 6 over the build plane 8 to irradiate the objects 2-4 in a layerwise successive manner.

Additionally, the apparatus 1 is connected with a communication interface 10, wherein the communication interface 10 can be considered as a component of the apparatus 1 or the communication interface 10 may be a separate component the apparatus 1 is connected with. The communication interface 10 may, for example, be designed as wired and/or wireless accessible platform, in particular an internet platform. Via the communication interface 10 data and/or information can be transmitted to the apparatus 1, in particular to the control unit 9. To store the respective data and/or information the apparatus 1 may further comprise a data storage 11. The data transmitted to and/or stored in the apparatus 1 are preferably encrypted to ensure that no other than authorized users can access the data, in particular confidential information.

As can further be derived from FIG. 1 an exemplary number of three users 12, 13, 14 transmit data sets via the communication interface 10 to the apparatus 1 (depicted by arrows). For example a first user 12 transmits a first data set 15, a second user 13 transmits a second data set 16 and a third user 14 transmits a third data set 17. The data sets 15-17 relate to the objects 2-4 to be manufactured, wherein, for instance, the first user 12 has the object 2 to be built, the second user 13 has the object 3 to be built and third user 14 has the object 4 to be built. The objects 2-4 are to be built in the same manufacturing process and on the same build plane 8. The objects 2-4 in particular differ, e.g. in shape and/or in their dimensions.

Further, depicted as a dashed line, another user 18 may transmit a data set 19 via the communication interface 10. The users 12-14 may be grouped into a first user group, for example "consumer" or "client" and the other user 18 may be assigned to a second user group, for example "provider" or "plant operator". The user 18 may therefore, be regarded as the operator of the apparatus 1 and may input data such as job data and/or build data. It is also possible that the job data and/or build data are generated automatically or that the build data are provided by the users 12-14.

In other words, the users 12-14 transmit data sets 15-17 via the communication interface 10, which data sets 15-17 relate to the objects 2-4 to be built throughout the additive manufacturing process performed by the apparatus 1. The data sets 15-17 comprise information relating to the objects 2-4, for example a chemical parameter such as the build material 5. In the embodiment depicted in FIG. 1, the objects 2-4 are to be built of the same build material 5. Further, the data sets 15-17 may comprise information relating to three-dimensional data of the objects 2-4, such as a dimensions and/or the shape of the objects 2-4 and/or physical parameters of the objects 2-4 such as the density and/or mechanical properties.

Further, each of the users 12-14 may add time information to the data sets 15-17, e.g. relating to a due date up to which the corresponding object 2-4 has to be built. Additionally, the data sets 15-17 may comprise information relating to at least one post-processing step that is to be performed on the corresponding object 2-4.

As described before, build data may be generated automatically by the apparatus 1, in particular by the control unit 9, or provided by the users 12-14, wherein the build data relate to information used for the manufacturing process, such as information relating to an irradiation strategy, wherein parameters are defined relating to the irradiation of at least one layer of at least one of the objects 2-4. Further, e.g. based on the data sets 15-17 various parameters can be determined, from which build data can be generated, such as the material consumption of the objects 2-4 or a writing time, i.e. a time required for the energy beam 6 to irradiate respective layers of the objects 2-4.

Based on the data sets 15-17 provided by the users 12-14 and/or the data set 19 provided by the user 18 and/or the build data (generated or provided) job data can be generated that relate to the entire manufacturing process of the objects 2-4. The job data may define the number of objects 2-4 and the number of users 12-14. Thus, the job data may also relate to the occupancy rate of the build plane 8 of the apparatus 1, wherein based on the build data and/or the job data and/or the data sets 15-17, 19 price information can be generated relating to the cost the individual users 12-14 have to bear.

The job data further can define an initiation information defining at least one initiation parameter, wherein the manufacturing process is initiated, if the initiation parameter is met. The initiation parameter, for example, may depend on the price information and/or the occupancy rate. Thus, the manufacturing process performed by the apparatus one may be initiated after a defined occupancy rate of the build plane 8 is met and/or after the price for the individual users 12-14 has reached a defined value.

The inventive method is further described according to an embodiment depicted in FIG. 2, wherein same reference signs are used. In a first step 20 of the inventive method the data sets 15-17 of the users 12-14 are transmitted to the communication interface 10. Further, the user 18 may transmit a data set 19 via the communication interface 10 to the apparatus 1. In step 21 the data sets 15-17 are transmitted to the apparatus 1, in particular stored in the data storage 11 or transmitted to the control unit 9 of the apparatus 1. As described before, the connection of the communication interface 10 to the control unit 9 and/or the data storage 11 does not have to be a direct connection. It is also possible to have the respective data sets 15-17 indirectly transferred to the apparatus 1, e.g. via a virtual machine or via a portable mass storage, such as a USB-stick. The object 2-4 the data sets 15-17 relate to are then assigned to the build plane 8 in a step 22, if various parameters are met, in particular that the object 2-4 are to be built of the build material 5 that is used on the build plane 8.

Afterwards, in a step 23 build data and/or a job data are generated based on the data sets 15-17. Based on the generated job data, in particular an initiation information contained in the job data, in step 24 is decided whether the manufacturing process is started. For example, if a predefined occupancy rate of the build plane 8 is not met, the initiation of the manufacturing process can be postponed until, for example another user 12-14 transmits a dataset 15-17 via the communication interface 10 relating to an object 2-4 that is suitable to be manufactured in the same manufacturing process on the same build plane 8, until the predefined occupancy rate is met.

After the requirements defined by the initiation information are fulfilled, in step 25 the manufacturing process is being performed. Afterwards in a step 26 at least one post-processing step may be performed to at least one of the object 2-4 as defined by the data sets 15-17. Thus, it may further be ensured that the built objects 2-4 are transferred, in particular shipped, to the corresponding user 12-14. Of course, the inventive method may be performed on the inventive apparatus 1.

The invention claimed is:

1. A method for operating at least one apparatus for additively manufacturing of three-dimensional objects by successive layerwise selective irradiation and consolidation of layers of a build material with an energy beam, comprising:
    receiving, with a communication interface connected or connectable with the at least one apparatus, at least a first data set comprising object data from at least a first user, relating to at least one object to be built, and at least a second data set comprising object data from at least a second user;
    storing, with a data storage, the first and second data sets;
    controlling, with a control unit, a manufacturing process of at least two objects dependent on the first and second data sets stored in the data storage;
    generating, with the control unit, at least one set of job data dependent on at least the first and second data sets stored in the data storage;
    storing, with the data storage, the at least one set of job data;
    assigning, with the control unit, a first object corresponding to the first data set and a second object corresponding to the second data set to a common build plane dependent on the at least one set of job data stored in the data storage, wherein the at least one set of job data comprises an occupancy rate of the common build plane; and
    initiating, with the control unit, the manufacturing process dependent on the occupancy rate of the common build plane.

2. The method according to claim 1, wherein the object data comprises at least one of the following parameters:
    three-dimensional data of at least one object to be built;
    at least one chemical parameter of the object to be built;
    at least one physical parameter of the object to be built;
    time information relating to a due date; or
    information relating to at least one post-processing step.

3. The method according to claim 2, wherein the object data comprises a material parameter as the at least one chemical parameter of the object.

4. The method according to claim 2, wherein the object data comprises a density and/or a mechanical property as the at least one physical parameter of the object to be built.

5. The method according to claim 1, wherein the at least one data set comprises build data relating to the at least one object to be built.

6. The method according to claim 5, wherein the build data comprise at least one of the following parameters:
    at least one chemical parameter of the object to be built;
    at least one physical parameter of the object to be built;
    time information relating to a duration of the manufacturing process of the object to be built;
    material consumption; or
    information relating to an irradiation strategy.

7. The method according to claim 1, wherein the at least one set of job data further comprises at least one of the following parameters:
    a number of objects assigned to at least one build plane;
    time information relating to a duration of the manufacturing process of all objects assigned to the common build plane;
    price information;
    initiation information;
    a number of build jobs; or
    a number of users.

8. The method according to claim 1, wherein the at least one data set is transmitted encrypted.

9. The method according to claim 1, wherein a topology and/or an orientation of the at least one object to be built is optimized, in that a material consumption and/or a build time and/or the occupancy rate of the build plane of the apparatus is reduced.

10. The method according to claim 1, wherein at least a portion of the data storage is a portable data storage.

11. The method according to claim 1, further comprising storing, with the data storage, the first and second data sets in an encrypted form.

12. The method according to claim 1, further comprising storing, with the data storage, the at least one set of job data in an encrypted form.

13. An apparatus for additively manufacturing of three-dimensional objects by successive layerwise selective irradiation and consolidation of layers of a build material with an energy beam, comprising:
    a communication interface connected or connectable with the at least one apparatus and adapted to receive at least a first data set comprising object data from at least a first user, relating to at least one object to be built, and at least a second data set comprising object data from at least a second user; and
    a control unit adapted to:
        store the first and second data sets in a data storage;
        control the manufacturing process of at least two objects dependent on the data sets of the at least two users;
        generate at least one set of job data dependent on at least the data sets of the at least two users;
        store the at least one set of job data in the data storage;
        assign the at least two objects to a common build plane dependent on the at least one set of job data wherein the at least one set of job data comprises an occupancy rate of the common build plane; and
        initiating the manufacturing process dependent on the occupancy rate of the common build plane.

14. The apparatus according to claim 13, wherein the at least one set of job data further comprises at least one of the following parameters:

time information relating to a duration of the manufacturing process of all objects assigned to the common build plane;
price information;
initiation information;
a number of build jobs; or
a number of users.

15. The apparatus according to claim 13, wherein at least a portion of the data storage is a portable data storage.

16. The apparatus according to claim 13, wherein the control unit is further adapted to store the first and second data sets in an encrypted form.

17. The apparatus according to claim 13, wherein the control unit is further adapted to store the at least one set of job data in an encrypted form.

* * * * *